(12) United States Patent
Luo et al.

(10) Patent No.: US 10,774,256 B2
(45) Date of Patent: Sep. 15, 2020

(54) STAR-SHAPED POLYACRYLAMIDE COPOLYMER AND PREPARATION METHOD THEREOF AND DRILLING FLUID INCLUDING THE COPOLYMER

(71) Applicant: China University of Geosciences, Beijing, Beijing (CN)

(72) Inventors: Zhihua Luo, Beijing (CN); Xuesong Xing, Beijing (CN); Peizhi Yu, Beijing (CN); Yu Wang, Beijing (CN); Bairu Xia, Beijing (CN); Ziming Wang, Beijing (CN)

(73) Assignee: China University of Geosciences, Beijing, Beijing (CN)

( * ) Notice: Subject to any disclaimer, the term of this patent is extended or adjusted under 35 U.S.C. 154(b) by 155 days.

(21) Appl. No.: 16/045,198

(22) Filed: Jul. 25, 2018

(65) Prior Publication Data
US 2019/0119550 A1 Apr. 25, 2019

(30) Foreign Application Priority Data
Oct. 23, 2017 (CN) .......................... 2017 1 0992475

(51) Int. Cl.
*C09K 8/24* (2006.01)
*C08L 41/00* (2006.01)
*C08L 33/26* (2006.01)
*C09K 8/88* (2006.01)
*C08F 220/56* (2006.01)

(52) U.S. Cl.
CPC .............. *C09K 8/24* (2013.01); *C08F 220/56* (2013.01); *C08L 33/26* (2013.01); *C08L 41/00* (2013.01); *C09K 8/88* (2013.01); *C08L 2205/14* (2013.01)

(58) Field of Classification Search
None
See application file for complete search history.

*Primary Examiner* — Jeffrey D Washville
(74) *Attorney, Agent, or Firm* — Wood Herron & Evans LLP

(57) ABSTRACT

A star-shaped polyacrylamide copolymer and a preparation method thereof are provided, as well as a drilling fluid containing the star-shaped polyacrylamide copolymer. Only the star-shaped polyacrylamide copolymer is added into the drilling fluid; under a high-temperature environment, the filtration volume of the drilling fluid can be reduced, the high-temperature rheological property of the drilling fluid is improved, and the pressure loss of a circulation system of the drilling fluid is reduced.

3 Claims, 2 Drawing Sheets

STAR-SHAPED POLYACRYLAMIDE COPOLYMER AND PREPARATION METHOD THEREOF AND DRILLING FLUID INCLUDING THE COPOLYMER

CROSS-REFERENCE TO RELATED APPLICATION

This application claims priority to Chinese application number 201710992475.7, filed Oct. 23, 2017. The above-mentioned patent application is incorporated herein by reference in its entirety.

TECHNICAL FIELD

The present invention relates to drilling fluids, and, in particular, relates to a star-shaped polyacrylamide copolymer used in a drilling fluid.

BACKGROUND

A drilling fluid is a generic term of various circulating fluids required to satisfy drilling work during drilling. The drilling fluid is an important component of drilling engineering, and has functions of suspending drilling cuttings, cleaning a wellbore, stabilizing a well wall, balancing a formation pressure, transmitting a hydrodynamic force, and cooling a drilling bit and a drilling tool. The success of drilling for oil, gas and geothermal resources largely depends on the property of a drilling fluid.

The rheological property is an important property of a drilling fluid and refers to the property of flow and deformation generated by a drilling fluid under an external stress. The rheological property has a significant effect on drilling cuttings and barite suspending, drilling cuttings carrying, well bottom and wellbore cleaning a mechanical rotation speed and a pressure loss in the circulation system. The filtration property refers to the phenomenon that free water in a drilling fluid filtrates into cracks or pores of rock of a well wall. An increase in filtration volumes of free water into the formation easily causes the instability of the well wall and the damage of an oil gas layer. In addition, if the formed mud cake is too thick, drilling accidents such as drilling sticking, a torque loss, and an increase in a circulating pressure loss may occur.

Currently, domestic and international drilling fluid systems mainly include a water-based drilling fluid and an oil-based drilling fluid. The water-based drilling fluid is a polyphase disperse system, where bentonite is dispersed in water used as a continuous phase and various additives are added to regulate the property of the drilling fluid to meet the demand of drilling. However, during deep drilling, the rheological property of the water-based drilling fluid is unstable and difficult to maintain. In addition, the filtration volumes of the water-based drilling fluid are greatly increased under a high temperature, and water going into a reservoir stratum may damage the reservoir stratum and cause the instability of the well wall, so that the rheological property of the water-based drilling fluid easily gets out of control. In the prior art, modified natural polymers and synthetic polymers are used to control the rheological and filtration properties of the water-based drilling fluid under a high temperature, where the polymers are all line-shaped or branched linear water-soluble polymers. The line-shaped polymers are either thermally degraded under a high temperature, losing the effect of reducing the filtration volumes, or cause too high viscosity of a drilling fluid system in a high temperature, reducing the purifying capacity of the wellbore, affecting the rheological property of the drilling fluid, and increasing the circulating pressure loss during drilling while controlling the filtration properties.

Accordingly, it would be desirable to improve drilling fluids to address these and other drawbacks in the known art.

SUMMARY

The objectives of the present invention are to provide a star-shaped polyacrylamide copolymer and a preparation method thereof and a drilling fluid, to improve the art of drilling fluids and address some or all the deficiencies described above.

To this end, in embodiments of the invention, only the star-shaped polyacrylamide copolymer is added into the drilling fluid; under a high-temperature environment, the high-temperature filtration properties of the drilling fluid can be controlled, the high-temperature rheological property of the drilling fluid is improved, and the pressure loss of a circulation system of the drilling fluid is reduced.

In one embodiment, the present invention provides a star-shaped polyacrylamide copolymer having a structure shown in Formula I:

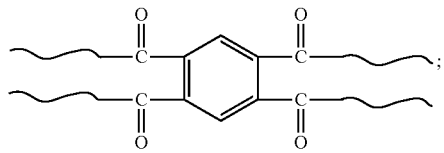

Formula I $\sim\!\!\sim$ in Formula I is:

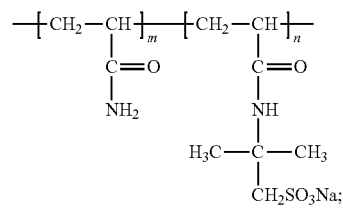

In one aspect, the viscosity-average molecular weight of the star-shaped polyacrylamide copolymer having a structure shown in Formula I is 10 million to 15 million.

In another embodiment, the present invention provides a method of synthesizing the star polyacrylamide copolymer, including the following synthesizing steps:

(a) mixing pyromellitic dianhydride, azo-4-cyano-pentanol, tetrahydrofuran, a nucleophilic catalyst and a dehydrating agent for an esterification reaction to obtain a tetrafunctional initiator; and (b) mixing the obtained tetrafunctional initiator, water, acrylamide and 2-acrylamido-2-methylpropanesulfonic acid for a copolymerization reaction under an oxygen-free condition to obtain the star-shaped polyacrylamide copolymer having a structure shown in Formula I.

In one aspect, the nucleophilic catalyst is 4-dimethylaminopyridine, and the dehydrating agent is 1,3-dicyclohexylcarbodiimide.

In another aspect, the dosage ratio of pyromellitic dianhydride, azo-4-cyano-pentanol, tetrahydrofuran, the nucleophilic catalyst and the dehydrating agent is 1 g:(2-4)g:(10-15) ml:(0.05-0.1)g:(0.25-0.5)g.

In a further aspect, the time of the esterification reaction is 24-36 hours.

In yet another aspect, the dosage ratio of tetrafunctional initiator, water, acrylamide, and 2-acrylamido-2-methylpropanesulfonic acid is (0.03-0.05)g:(10-15) ml:(30-50)g:(7-10)g.

In some embodiments, the temperature of the copolymerization reaction is 70-80° C., and the time of the copolymerization reaction is 8-16 hours.

In one aspect, the PH value of the copolymerization reaction is 6.5-7.5.

In a further embodiment, the present invention provides a drilling fluid, including a base mud and a star-shaped polyacrylamide copolymer having a structure shown in Formula I, where the base mud includes distilled water, sodium bentonite and sodium carbonate.

In one aspect, the mass percent of the star-shaped polyacrylamide copolymer having a structure shown in Formula I in the base mud is 0.1%-0.5%.

Compared with the prior art, the method described herein achieves several advantages and beneficial effects. These include having only the star-shaped polyacrylamide copolymer added into the drilling fluid; under a high-temperature environment, the filtration volumes of the drilling fluid can be reduced, and the high-temperature rheological property of the drilling fluid is improved, and the pressure loss of a circulation system of the drilling fluid is reduced. Data of examples show that, under a high-temperature and high-pressure condition, compared with line-shaped polyacrylamide copolymers, the star-shaped polyacrylamide copolymer can generate a less filtration volumes of a water-based drilling fluid, and a freshwater base mud containing the star-shaped polyacrylamide copolymer can generate a less pressure loss of a circulation system of the drilling fluid and a better hydraulic parameter during drilling.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrates one or more embodiments of the invention and, together with the general description given above and the detailed description given below, explains the one or more embodiments of the invention.

DETAILED DESCRIPTION

Figure 1:
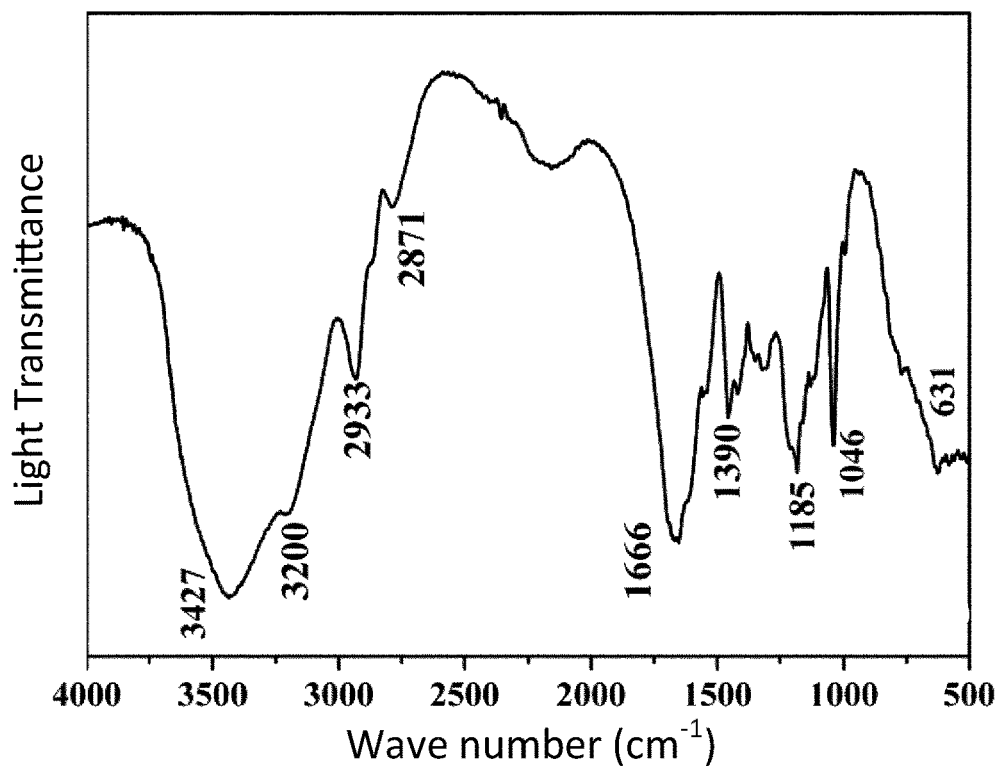
FIG. 1 is a graphical plot illustrating an FTIR spectrum of a star-shaped polyacrylamide copolymer prepared in a first embodiment of the invention.

Embodiments of the invention are illustrated below with reference to the accompanying drawings. The preferred embodiments described here are used only to describe and explain the present disclosure, but not to limit the present disclosure.

The present invention provides a star-shaped polyacrylamide copolymer having a structure shown in Formula I:

Formula I

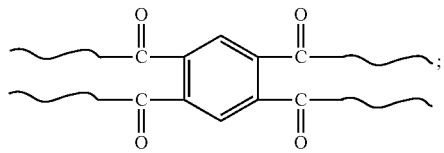

 in Formula I is:

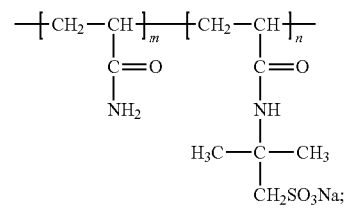

The viscosity-average molecular weight of the star-shaped polyacrylamide copolymer having a structure shown in Formula I is 10 million to 15 million, preferably 11 million to 14 million, and more preferably 12 million to 13 million.

The present invention further provides a method of synthesizing the star polyacrylamide copolymer, including the following synthesizing steps: (a) mixing pyromellitic dianhydride, azo-4-cyano-pentanol, tetrahydrofuran, a nucleophilic catalyst and an dehydrating agent for an esterification reaction to obtain a tetrafunctional initiator; and (b) mixing the obtained tetrafunctional initiator, water, acrylamide and 2-acrylamido-2-methylpropanesulfonic acid for a copolymerization reaction under an oxygen-free condition to obtain the star-shaped polyacrylamide copolymer having a structure shown in Formula I.

In the present invention, pyromellitic dianhydride, azo-4-cyano-pentanol, tetrahydrofuran, the nucleophilic catalyst and the dehydrating agent are mixed for the esterification reaction to obtain the tetrafunctional initiator.

In the present invention, preferably, pyromellitic dianhydride, azo-4-cyano-pentanol and tetrahydrofuran are mixed and then the nucleophilic catalyst and the dehydrating agent are added to obtain an esterification reaction fluid.

In the present invention, the nucleophilic catalyst is preferably 4-dimethylaminopyridine, and the dehydrating agent is preferably 1,3-dicyclohexylcarbodiimide.

In the present invention, the dosage ratio of pyromellitic dianhydride, azo-4-cyano-pentanol, tetrahydrofuran, the nucleophilic catalyst and the dehydrating agent is 1 g:(2-4) g:(10-15) ml:(0.05-0.1)g:(0.25-0.5)g, and more preferably 1 g:(2.5-3.5)g:(11-13) ml:(0.07-0.09)g:(0.30-0.40)g.

In the present invention, the esterification reaction is preferably under a room temperature condition without additional heating or cooling, and the time of the esterification reaction is preferably 24-36 hours, and more preferably 28-32 hours.

After obtaining the esterification reaction fluid, in the present invention, preferably, the esterification reaction fluid is distilled and dried to obtain the tetrafunctional initiator.

In the present invention, the distillation temperature is preferably 45-50° C., and the time of distillation is preferably 2.5-3 hours.

In the present invention, the drying method is not specially limited and can be any drying method well-known by persons skilled in the art.

After obtaining the tetrafunctional initiator, the present invention mixes the tetrafunctional initiator, water, acrylamide and 2-acrylamido-2-methylpropanesulfonic acid for a copolymerization reaction under an oxygen-free condition to obtain a copolymerization reaction fluid.

In the present invention, the dosage ratio of tetrafunctional initiator, water, acrylamide, and 2-acrylamido-2-methylpropanesulfonic acid is preferably (0.03-0.05)g:(10-15) ml:(30-50)g:(7-10)g, and more preferably (0.03-0.04)g:(11-13) ml:(34-45)g:(8-9)g.

In the present invention, the temperature of the copolymerization reaction is preferably 70-80° C., and more preferably 75-80° C.; the time of the copolymerization reaction is preferably 8-16 hours, and more preferably 10-14 hours; and the PH value of the copolymerization reaction is preferably 6.5-7.5, and more preferably 7.

In the present invention, the method of regulating a PH value is not specially limited and can be any method well-known by persons skilled in the art. In the present invention, preferably, after the tetrafunctional initiator, water, acrylamide, and 2-acrylamido-2-methylpropanesulfonic acid are mixed, NaOH is added to regulate the PH value.

In the present invention, the method of providing an oxygen-free environment is not specially limited and can be any method well-known by persons skilled in the art. In the present invention, preferably, after regulating the PH value, an inert gas is injected, and vacuum pumping is performed to remove oxygen, providing an oxygen-free environment.

After obtaining the copolymerization reaction fluid, in the present invention, preferably, the obtained copolymerization reaction fluid is successively precipitated, filtered, and dried to obtain a star-shaped polyacrylamide copolymer having a structure shown in Formula I.

In the present invention, absolute ethyl alcohol is preferably used a precipitator.

In the present invention, the filtering method is not specially limited and can be any filtering method well-known by persons skilled in the art. In the present invention, suction filtration is preferably used for filtering.

In the present invention, the drying method is not specially limited and can be any drying method well-known by persons skilled in the art.

The present invention further provides a drilling fluid, including a base mud and a star-shaped polyacrylamide copolymer having a structure shown in Formula I, where the base mud includes distilled water, sodium bentonite and sodium carbonate.

In the present invention, the base mud is preferably a freshwater base mud, and is more preferably obtained by preparing according to the American Petroleum Institute Standard (API RP 131, 2004) and then being placed for 24 hours under a room temperature condition.

In the present invention, the mass percent of the star-shaped polyacrylamide copolymer having a structure shown in Formula I in the base mud is preferably 0.1%-0.5%, and more preferably 0.3%.

In the present invention, the star-shaped polyacrylamide copolymer is mixed with the base mud according to the mass percent to obtain the drilling fluid.

The star-shaped polyacrylamide copolymer and the preparation method thereof and the drilling fluid provided by the present invention are described below in detail through several examples, which are not regarded as a limit to the protection scope of the present invention.

Embodiment 1

2.0 g of pyromellitic dianhydride and 4.0 g of azo-4-cyano-pentanol were dissolved in 20 ml of anhydrous tetrahydrofuran, and 100 mg of the catalyst 4-dimethylaminopyridine (DMAP) and 500 mg of the dehydrating agent 1,3-dicyclohexylcarbodiimide (DCC) were added for reaction for 24 hours under a room temperature to obtain an esterification reaction fluid. The esterification reaction fluid was distilled and dried to obtain a tetrafunctional initiator.

Then, 30 mg of the synthesized tetrafunctional initiator was dissolved in deionized water. 32 g of acrylamide monomers (AM) and 7.24 g of 2-acrylamido-2-methylpropanesulfonic acid (AMPS) were added in the system. The system was neutralized by NaOH such that the PH value was 7. After the system was completely dissolved, argon gas injection and vacuum pumping were performed in turn several times to remove oxygen. Then, the reaction system was placed into a water bath of 70° C. for 8 hours. Then, absolute ethyl alcohol was added to precipitate. Then, suction filtration was performed to remove a solvent. The system was placed into a vacuum drying oven and dried to have a constant weight, and then pulverized to obtain a white powder.

IR characterization was performed on the white powder. The result is shown in FIG. 1: 3427 cm$^{-1}$ is the stretching vibrational absorption peak of primary amine $NH_2$ in AM, 3200 cm$^{-1}$ is the characteristic absorption peak of secondary amine NH in AMPS, 2933 cm$^{-1}$ is the characteristic absorption peak of the chain —$CH_2$, 1666 cm$^{-1}$ is the stretching vibrational absorption peak of carbonyl (C=O) of amide, and 1046 cm$^{-1}$ and 1185 cm$^{-1}$ are the characteristic absorption peaks of bonds S=O and C=O in sulfo —$SO^{3-}$. It is shown that, the white powder in Example 1 is the star-shaped polyacrylamide copolymer S-Poly (AM-co-AMPS).

The viscosity average molecular weight of S-Poly (AM-co-AMPS) was measured as $9.81 \times 10^6$.

Embodiment 2

2.0 g of pyromellitic dianhydride and 8.0 g of azo-4-cyano-pentanol were dissolved in 30 ml of anhydrous tetrahydrofuran, and 200 mg of the catalyst 4-dimethylaminopyridine (DMAP) and 750 mg of the dehydrating agent 1,3-dicyclohexylcarbodiimide (DCC) were added for reaction for 24 hours under a room temperature. The product was distilled and dried to obtain a tetrafunctional initiator.

Then, 30 mg of the synthesized tetrafunctional initiator was dissolved in 10 ml of deionized water. 35 g of acrylamide monomers (AM) and 8 g of 2-acrylamido-2-methylpropanesulfonic acid (AMPS) were added in the system. The system was neutralized by NaOH such that the PH value was 6.5. After the system was completely dissolved, argon gas injection and vacuum pumping were performed in turn several times to remove oxygen. Then, the reaction system was placed into a water bath of 75° C. for 10 hours. Then, absolute ethyl alcohol was added to precipitate. Then, suction filtration was performed to remove a solvent. The system was placed into a vacuum drying oven and dried to have a constant weight, and then pulverized to obtain a white powder, which was a star-shaped polyacrylamide copolymer S-Poly (AM-co-AMPS).

The viscosity average molecular weight of S-Poly (AM-co-AMPS) was measured as $1.23 \times 10^7$.

Embodiment 3

2.0 g of pyromellitic dianhydride and 6.0 g of azo-4-cyano-pentanol were dissolved in 25 ml of anhydrous tetrahydrofuran, and 150 mg of the catalyst 4-dimethylaminopyridine (DMAP) and 1 g of the dehydrating agent 1,3-dicyclohexylcarbodiimide (DCC) were added for reaction for 24 hours under a room temperature. The product was distilled and dried to obtain a tetrafunctional initiator.

Then, 50 mg of the synthesized tetrafunctional initiator was dissolved in 15 ml of deionized water. 50 g of acrylamide monomers (AM) and 10 g of 2-acrylamido-2-methylpropanesulfonic acid (AMPS) were added in the system. The system was neutralized by NaOH such that the PH value was 7.5. After the system was completely dissolved, argon gas injection and vacuum pumping were performed in turn several times to remove oxygen. Then, the reaction system was placed into a water bath of 80° C. for 16 hours. Then, absolute ethyl alcohol was added to precipitate. Then, suction filtration was performed to remove a solvent. The system was placed into a vacuum drying oven and dried to have a constant weight, and then pulverized to obtain a white powder, which was a star-shaped polyacrylamide copolymer S-Poly (AM-co-AMPS).

The viscosity average molecular weight of S-Poly (AM-co-AMPS) was measured as $1.45 \times 10^7$.

Embodiment 4

1000 ml of distilled water, 40 g of sodium bentonite and 2 g of sodium carbonate were mixed and placed under a room temperature condition for 24 hours, obtaining a freshwater base mud.

The star-shaped polyacrylamide copolymer S-Poly (AM-co-AMPS) prepared in Example 1 and the freshwater base mud were mixed to prepare drilling fluids in which the mass percent of the star-shaped polyacrylamide copolymer in the freshwater base mud were 0.1%, 0.2%, 0.3%, 0.4% and 0.5%, respectively.

COMPARATIVE EXAMPLE 1

Synthetization of a line-shaped polyacrylamide copolymer L-Poly (AM-co-AMPS) is provided as follows.

Then, a redox system consisting of 10 mg of the $NaHSO_3$ and 4 mg of $Na_2S_2O_8$ was used as an initiator and dissolved in 10 ml of deionized water. 32 g of acrylamide monomers (AM), 7.24 g of 2-acrylamido-2-methylpropanesulfonic acid (AMPS), and an initiator including 1 ml of a $NaHSO_3$ solution and 1 ml of a $Na_2S_2O_8$ solution were added in the system. The system was neutralized by NaOH such that the PH value was 7. After the system was completely dissolved, argon gas injection and vacuum pumping were performed in turn several times to remove oxygen. Then, the reaction system was placed into a water bath of 55° C. for 8 hours. Absolute ethyl alcohol was added to dewater. Then, suction filtration was performed to remove a solvent. The system was placed into a vacuum drying oven and dried to have a constant weight, and then pulverized to obtain a white powder, which was a line-shaped polyacrylamide copolymer L-Poly (AM-co-AMPS).

The viscosity average molecular weight of S-Poly (AM-co-AMPS) was measured as $10.05 \times 10^6$. The viscosity average molecular weights of the synthesized S-Poly (AM AM-co-AMPS) and L-Poly (AM AM-co-AMPS) have an error within 5%. It can be considered that the synthesized S-Poly (AM AM-co-AMPS) and L-Poly (AM AM-co-AMPS) have the same molecular weight.

The prepared line-shaped polyacrylamide copolymer S-Poly (AM-co-AMPS) and the freshwater base mud prepared in Example 4 were mixed to prepare drilling fluids in which the mass percent of the line-shaped polyacrylamide copolymer in the freshwater base mud were 0.1%, 0.2%, 0.3%, 0.4% and 0.5%, respectively.

In the present invention, the affection of S-Poly (AM-co-AMPS) and L-Poly (AM AM-co-AMPS) with different concentrations on the rheological property of the water-based drilling fluid before and after aging at 120° C. and 160° C. was researched through the Bingham model. Specifically, drilling fluids in Example 4 and Comparative Example 1 were poured into an aging tank. The aging tank was sealed, placed in a high-temperature roller furnace, continuously rolled for 16 hours under 120° C. and 160° C. conditions, and then cooled to a room temperature. Then, the rheological property and the filtration property were measured.

TABLE 1

Affection of the concentration of S-Poly (AM-co-AMPS) in Example 4 on the rheological property of water-based drilling fluid

| Concentration (%) | Experiment | Apparent viscosity | Plastic viscosity (mPa · s) | Yield point (Pa) | Yield point-plastic |
|---|---|---|---|---|---|
| Base mud | a | 5.5 | 4.5 | 1 | 0.22 |
| | b | 2.0 | 2.0 | 0 | 0 |
| | c | 2.0 | 2.0 | 0 | 0 |
| 0.1 | a | 15.5 | 11 | 4.5 | 0.41 |
| | b | 6.0 | 4.5 | 1.5 | 0.33 |
| | c | 3.5 | 3.0 | 0.5 | 0.17 |
| 0.2 | a | 19.25 | 11.5 | 7.75 | 0.67 |
| | b | 9.5 | 7.0 | 2.5 | 0.36 |
| | c | 4.75 | 4.0 | 0.75 | 0.19 |
| 0.3 | a | 25.0 | 14.0 | 11.0 | 0.78 |
| | b | 14.5 | 10.0 | 4.5 | 0.45 |
| | c | 5.5 | 4.0 | 1.5 | 0.37 |
| 0.4 | a | 26.5 | 15.0 | 11.5 | 0.77 |
| | b | 17.5 | 12.5 | 5.0 | 0.40 |
| | c | 6.0 | 4.5 | 1.5 | 0.33 |
| 0.5 | a | 32.75 | 18.5 | 14.25 | 0.77 |
| | b | 25.5 | 18.5 | 7.0 | 0.38 |
| | c | 7.25 | 5.5 | 1.75 | 0.32 |

Key:
a: before aging;
b: aging at 120° C. for 16 hours;
c: aging at 160° C. for 16 hours.

TABLE 2

Affection of the concentration of L-Poly (AM-co-AMPS) in Comparative example 1 on the rheological property of the water-based drilling fluid

| Concentration (%) | Experiment condition | Apparent viscosity (mPa·s) | Plastic viscosity (mPa·s) | Yield point (Pa) | Yield point-plastic viscosity ratio (Pa/mPa·s) |
|---|---|---|---|---|---|
| Base mud | a | 5.5 | 4.5 | 1 | 0.22 |
| | b | 2.0 | 2.0 | 0 | 0 |
| | c | 2.0 | 2.0 | 0 | 0 |
| 0.1 | a | 16.0 | 9.0 | 7.0 | 0.78 |
| | b | 9.0 | 7.5 | 1.5 | 0.2 |
| | c | 5.0 | 4.5 | 0.5 | 0.11 |
| 0.2 | a | 20.75 | 11.0 | 9.75 | 0.89 |
| | b | 17.0 | 13.5 | 3.5 | 0.26 |
| | c | 8.0 | 7.0 | 1.0 | 0.14 |
| 0.3 | a | 28.5 | 14.5 | 14 | 0.97 |
| | b | 20.0 | 15.0 | 5.0 | 0.33 |
| | c | 11.5 | 9.5 | 2 | 0.21 |
| 0.4 | a | 31.5 | 16.0 | 15.5 | 0.97 |
| | b | 30.0 | 22.5 | 7.5 | 0.33 |
| | c | 13.75 | 11.5 | 2.25 | 0.20 |
| 0.5 | a | 36.25 | 18.5 | 17.75 | 0.96 |
| | b | 32.0 | 24.0 | 8.0 | 0.33 |
| | c | 14.5 | 12.0 | 2.5 | 0.21 |

Key:
a: before aging;
b: aging at 120° C. for 16 hours;
c: aging at 160° C. for 16 hours.

In the process of drilling fluid, parameters such as the apparent viscosity, the plastic viscosity, the yield point, and the yield point-plastic viscosity ratio are used to represent the rheological property of the drilling fluid in the Bingham model. The apparent viscosity $\mu_a$ is used to calculate the pressure loss of a circulation system, where large $\mu_a$ indicates a high-pressure loss of the circulation system and a low water power obtained by a drilling bit, and small $\mu_a$ indicates a low-pressure loss of the circulation system and a high water power obtained by the drilling bit. The yield point-plastic viscosity ratio $\tau_0/\mu_p$ is used to represent the shear thinning behavior of the drilling fluid, that is, the characteristic that the viscosity of the drilling fluid decreases as the shearing rate increases. According to on-site experience, it is generally required that the drilling fluid has a high yield point-plastic viscosity ratio, which is generally controlled to be 0.36-0.48 Pa/(mPa·s). In this way, it can be ensured that the drilling fluid can not only effectively crush rock at a high shearing rate but also carry rock cuttings at a low shearing rate very well. In some extended reach wells and horizontal wells, to ensure secure and rapid drilling, a greater yield point-plastic viscosity ratio is required to satisfy the requirements of drilling.

It can be seen from Table 1 and Table 2 that, after high-temperature aging, freshwater base mud without a polymer has a yield point of 0 and a yield point-plastic viscosity ratio of 0, indicating that the freshwater base mud after a high-temperature loses the capabilities of rock carrying and wellbore cleaning. After being added, S-Poly (AM-co-AMPS) and L-Poly (AM-co-AMPS) both increase the yield point-plastic viscosity ratio of the freshwater base mud before and after aging but have different affections on the yield point-plastic viscosity ratio of the freshwater base mud. For S-Poly (AM-co-AMPS) and L-Poly (AM-co-AMPS) with the same concentration, before aging, the yield point-plastic viscosity ratio of the freshwater base mud containing S-Poly (AM-co-AMPS) is always less than the yield point-plastic viscosity ratio of the freshwater base mud containing L-Poly (AM-co-AMPS) with the same concentration. In the process of drilling fluid, the yield point-plastic viscosity ratio is generally controlled within 0.36-0.48 Pa/(mPa·s). If the yield point-plastic viscosity ratio is too small, the drilling fluid cannot effectively carry drilling cuttings and clean a wellbore; if the yield point-plastic viscosity ratio is too large, although the drilling fluid can carry drilling cuttings and clean a wellbore very well, the circulating pressure loss of the drilling fluid in a wellbore annulus increases, so that water power obtained by the drilling bit decreases and the drilling speed decreases. Therefore, before hot rolling, compared with the freshwater base mud containing L-Poly (AM-co-AMPS), the freshwater base mud containing S-Poly (AM-co-AMPS) has better rheological property.

In addition, a star-shaped polymer has better dissolubility in water than a line-shaped polymer having the same molecular weight, so that drilling fluid preparing is easier on a worksite. After hot rolling, the yield point-plastic viscosity ratio of the freshwater base mud containing line-shaped L-Poly (AM-co-AMPS) decreases more rapidly than the yield point-plastic viscosity ratio of the freshwater base mud containing star-shaped S-Poly (AM-co-AMPS) with the same concentration. In addition, the yield point-plastic viscosity ratios of freshwater base mud containing star-shaped S-Poly (AM-co-AMPS) with different concentrations are within or closer to a suitable value range. It is shown that, compared with freshwater base mud containing L-Poly (AM-co-AMPS), freshwater base mud containing S-Poly (AM-co-AMPS) has better rheological property. In addition, before and after aging, the apparent viscosity of the freshwater base mud containing S-Poly (AM-co-AMPS) with the same concentration is always less than the apparent viscosity of the freshwater base mud containing corresponding L-Poly (AM-co-AMPS). It is shown that, the freshwater base mud containing S-Poly (AM-co-AMPS) can obtain a lower pressure loss of the circulation system of the drilling fluid and a better hydraulic parameter during the drilling process. Moreover, it can be seen from Table 1 and Table 2 that, when the concentration of the polymer is 0.3%, the rheological property of the freshwater base mud is best.

TABLE 3

Affection of different structures of Poly (AM-co-AMPS) in Example 4 and Comparative Example 1 on the API filtration property of water-based drilling fluid

| Concentration | | 0 | 0.1 | 0.2 | 0.3 | 0.4 | 0.5 |
|---|---|---|---|---|---|---|---|
| Embodiment 1 | a | 33 | 15 | 13 | 9 | 11 | 12 |
| | b | 44 | 19.5 | 17 | 14 | 18 | 19 |
| | c | 57 | 35 | 27.5 | 22 | 24 | 25 |
| Comparative Embodiment 1 | a | 33 | 11 | 10 | 7 | 9 | 9 |
| | b | 44 | 16 | 15 | 13 | 16 | 18 |
| | c | 57 | 28 | 20 | 17 | 18 | 19 |

Key:
a: before aging;
b: aging at 120° C. for 16 hours;
c: aging at 160° C. for 16 hours.

Figure 2:
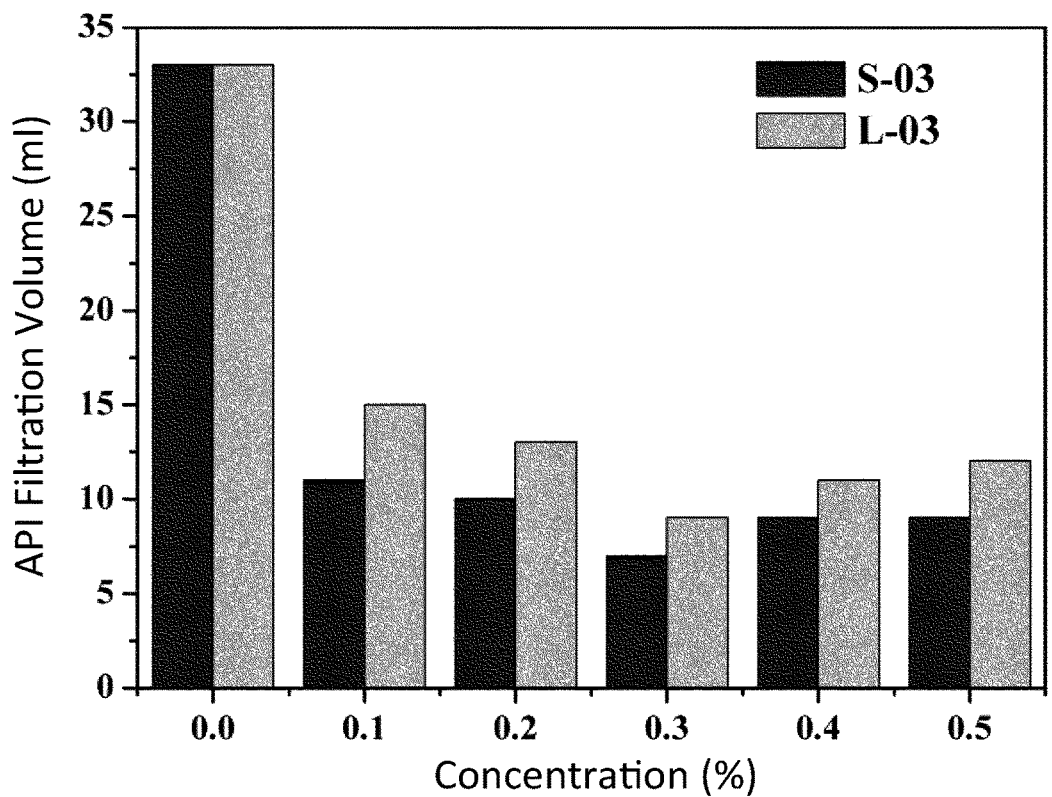
FIG. 2 is a graphical plot illustrating the affection of different structures of Poly (AM-co-AMPS) in a fourth embodiment of the invention on the API filtration property of water-based drilling fluid before aging.

FIG. 2 shows the affection of different structures of Poly (AM-co-AMPS) in Example 4 and Comparative Example 1 on the API filtration property of water-based drilling fluid before aging.

Figure 3:
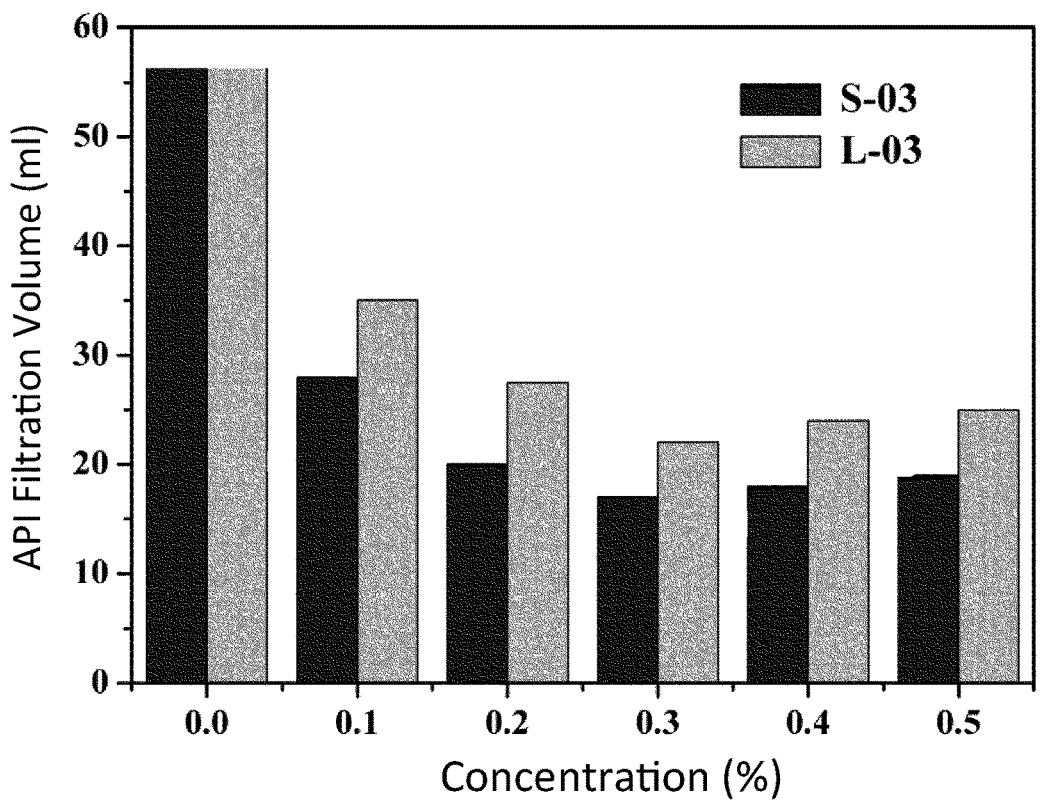
FIG. 3 is a graphical plot illustrating the affection of different structures of Poly (AM-co-AMPS) in a fourth embodiment of the invention on the API filtration property of water-based drilling fluid after aging at 160° C.

FIG. 3 shows the affection of different structures of Poly (AM-co-AMPS) in Example 4 and Comparative Example 1 on the API filtration property of water-based drilling fluid after aging at 160° C.

As shown in Table 3, FIG. 2, and FIG. 3, after different structures of (star-shaped or line-shaped) Poly (AM-co-AMPS) are added in freshwater base mud, before aging and after high-temperature aging, the filtration volume of the drilling fluid both decrease apparently, effectively prevent a solid phase and a liquid phase in the drilling fluid from going into formation and oil rock. As the concentration of Poly (AM-co-AMPS) increases, a law appears, that is, the filtration volume of the drilling fluid decreases first and then increases, where the preferred concentration is 0.3%. Compared with freshwater base mud without any additive, before aging, the filtration volume of the drilling fluid containing 0.3% of S-Poly (AM-co-AMPS) is 7 ml, and the filtration volume of the drilling fluid containing 0.3% of L-Poly (AM-co-AMPS) is 9 ml; after aging at 160° C., the filtration volume of the drilling fluid containing 0.3% of S-Poly (AM-co-AMPS) is 17 ml, and the filtration volume of the drilling fluid containing 0.3% of L-Poly (AM-co-AMPS) is 22 ml. It is shown that, compared with the corresponding L-Poly (AM-co-AMPS), S-Poly (AM-co-AMPS) has a better filtration volume reducing effect, and the effect is more apparent if the temperature is higher.

TABLE 4

Affection of different structures of Poly (AM-co-AMPS) in Example 4 and Comparative Example 1 on the HTHP filtration property of water-based drilling fluid

| Concentration (%) | | 0 | 0.1 | 0.2 | 0.3 | 0.4 | 0.5 |
|---|---|---|---|---|---|---|---|
| Embodiment 1 | a | 60 | 23 | 20 | 16 | 18 | 20 |
| | b | 65 | 35 | 34 | 30 | 32 | 33 |
| Comparative | a | 60 | 20 | 15.5 | 15 | 18 | 19 |
| Embodiment 1 | b | 65 | 32 | 30 | 27 | 29 | 31 |

Key:
a: aging at 120° C. for 16 hours;
b: aging at 160° C. for 16 hours.

Figure 4:
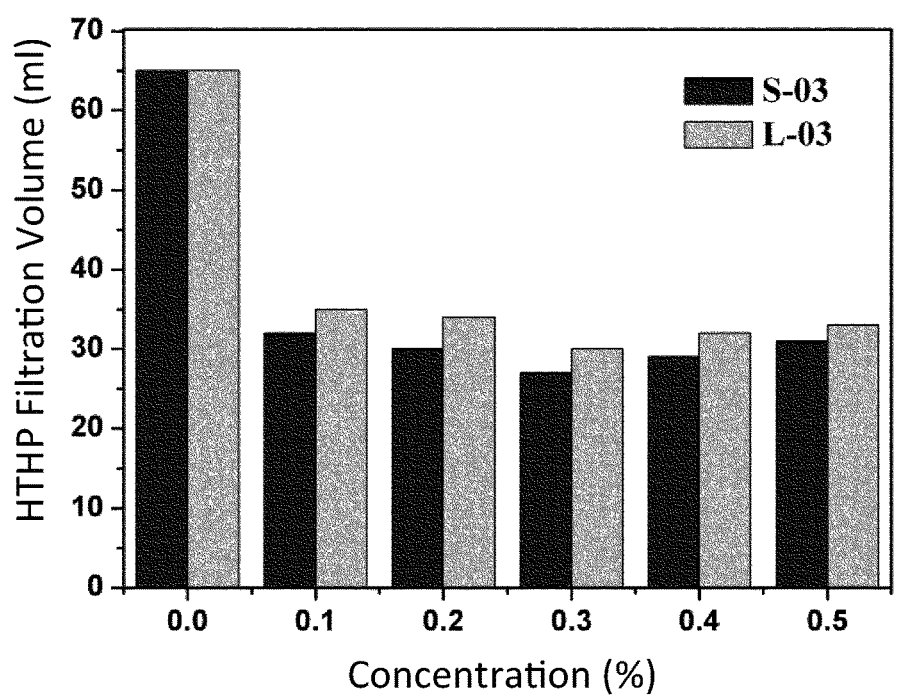
FIG. 4 is a graphical plot illustrating the affection of different structures of Poly (AM-co-AMPS) in a fourth embodiment of the invention on the HTHP filtration property of water-based drilling fluid under the 160° C. condition.

FIG. 4 shows the affection of different structures of Poly (AM-co-AMPS) in Example 4 and Comparative Example 1 on the HTHP filtration property of water-based drilling fluid under the 160° C. condition.

It can be seen from Table 4 and FIG. 4 that, S-Poly (AM-co-AMPS) and L-Poly (AM-co-AMPS) with different concentrations both have a good effect of reducing the filtration property of the water-based drilling fluid, where when the concentration is 0.3%, the filtration volume reducing result is optimum. Compared with freshwater base mud without any additive, under 120° C. and 160° C. conditions, when S-Poly (AM-co-AMPS) with a concentration of 0.3% is added to the drilling fluid, the filtration volumes of the drilling fluid are 15 ml and 27 ml respectively; when L-Poly (AM-co-AMPS) with a concentration of 0.3% is added to the drilling fluid, the filtration volumes of the drilling fluid are 16 ml and 30 ml respectively. It is shown that, under a high-temperature and high-pressure condition, S-Poly (AM-co-AMPS) can obtain a less filtration volume of the water-based drilling fluid than L-Poly (AM-co-AMPS).

In sum, at a high temperature, the star-shaped polyacrylamide copolymer S-Poly (AM-co-AMPS) provided by the present invention can not only stabilize the rheological property of the drilling fluid and reduce the pressure loss of the circulation system of the drilling fluid, but also have a good effect of reducing the filtration volume.

The foregoing descriptions are only preferred implementation manners of the present invention. It should be noted that for a person of ordinary skill in the art, several improvements and modifications may further be made without departing from the principle of the present invention. These improvements and modifications should also be deemed as falling within the protection scope of the present invention.

What is claimed is:

1. A star-shaped polyacrylamide copolymer, comprising a structure shown in Formula I:

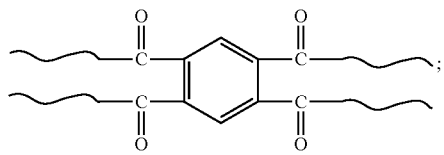

Formula I

~~ in Formula I is:

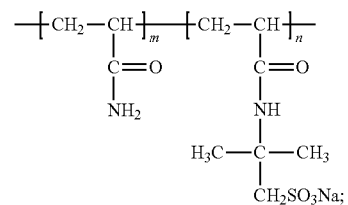

wherein m is in a range of 25444 to 46390, and n is in a range of 1327 to 4543 in the Formula I, and
wherein a viscosity-average molecular weight of the star-shaped polyacrylamide copolymer having a structure shown in Formula I is 10 million to 15 million.

2. A drilling fluid, comprising:
a base mud; and
a star-shaped polyacrylamide copolymer, having a structure shown in Formula I:

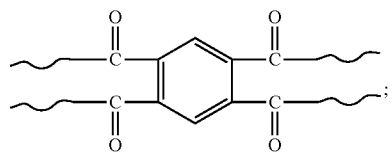

Formula I

~~ in Formula I is:

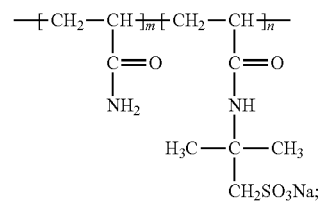

wherein m is in a range of 25444 to 46390, and n is in a range of 1327 to 4543 in the Formula I,
wherein a viscosity-average molecular weight of the star-shaped polyacrylamide copolymer having a structure shown in Formula I is 10 million to 15 million, and
wherein the base mud comprises distilled water, sodium bentonite and sodium carbonate.

3. The drilling fluid of claim 2, wherein a mass percent of the star-shaped polyacrylamide copolymer having a structure shown in Formula I in the base mud is 0.1%-0.5%.

\* \* \* \* \*